US010968324B2

(12) United States Patent
Tsutsumi et al.

(10) Patent No.: US 10,968,324 B2
(45) Date of Patent: Apr. 6, 2021

(54) RESIN COMPOSITE AND METHOD FOR PRODUCING RESIN COMPOSITE

(71) Applicant: OJI HOLDINGS CORPORATION, Tokyo (JP)

(72) Inventors: Yoshiyuki Tsutsumi, Tokushima (JP); Koh Sakai, Chiba (JP); Yuichi Noguchi, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 16/074,638

(22) PCT Filed: Feb. 3, 2017

(86) PCT No.: PCT/JP2017/003998
§ 371 (c)(1),
(2) Date: Aug. 1, 2018

(87) PCT Pub. No.: WO2017/135413
PCT Pub. Date: Aug. 10, 2017

(65) Prior Publication Data
US 2019/0040213 A1    Feb. 7, 2019

(30) Foreign Application Priority Data
Feb. 3, 2016    (JP) .............................. JP2016-018688

(51) Int. Cl.
| | |
|---|---|
| *C08J 5/06* | (2006.01) |
| *C08L 1/02* | (2006.01) |
| *C08B 5/00* | (2006.01) |
| *C08L 29/04* | (2006.01) |
| *C08K 7/02* | (2006.01) |
| *C08J 3/03* | (2006.01) |
| *C08L 101/12* | (2006.01) |

(Continued)

(52) U.S. Cl.
CPC ..................... *C08J 5/06* (2013.01);
*C08B 5/00* (2013.01); *C08J 3/03* (2013.01);
*C08K 7/02* (2013.01);
(Continued)

(58) Field of Classification Search
CPC ....... C08L 1/02; C08L 2205/16; D21H 11/18; D21H 11/20; D21H 21/20; D21H 21/25;
(Continued)

(56) References Cited

U.S. PATENT DOCUMENTS

| | | | |
|---|---|---|---|
| 2011/0262731 A1 | 10/2011 | Mukai et al. | |
| 2012/0000392 A1 | 1/2012 | Mukai et al. | |
| 2015/0027648 A1* | 1/2015 | Tsuji | C08B 15/04 162/24 |

FOREIGN PATENT DOCUMENTS

| | | |
|---|---|---|
| CN | 105209686 A | 12/2015 |
| CN | 107923126 A | 4/2018 |

(Continued)

OTHER PUBLICATIONS

International Search Report and Written Opinion, dated Mar. 21, 2017 from the International Bureau in counterpart International application No. PCT/JP2017/003998.
(Continued)

*Primary Examiner* — Camie S Thompson
(74) *Attorney, Agent, or Firm* — Sughrue Mion, PLLC

(57) ABSTRACT

It is an object of the present invention to provide a resin composite that is excellent in water resistance and is capable of exerting sufficient strength even under wet conditions. The present invention relates to a resin composite comprising a resin, fibers having an ionic functional group, and a polyvalent ion. The fibers having an ionic functional group are preferably cellulose fibers having a fiber width of 1000 nm or less.

12 Claims, 1 Drawing Sheet

(51) Int. Cl.
*C08K 3/30* (2006.01)
*C08K 3/16* (2006.01)

(52) U.S. Cl.
CPC .............. *C08L 1/02* (2013.01); *C08L 29/04* (2013.01); *C08L 101/12* (2013.01); *C08J 2300/12* (2013.01); *C08J 2300/14* (2013.01); *C08J 2401/02* (2013.01); *C08K 2003/166* (2013.01); *C08K 2003/3072* (2013.01); *C08K 2003/3081* (2013.01); *C08K 2201/002* (2013.01); *C08L 2205/16* (2013.01)

(58) Field of Classification Search
CPC .......... D21H 21/37; D21H 21/66; C08B 5/00; C08J 2401/02; C08J 3/03; C08J 5/06; C08K 7/02
USPC .................... 162/24, 26; 428/297.4; 8/115.6
See application file for complete search history.

(56) References Cited

FOREIGN PATENT DOCUMENTS

| EP | 3 333 316 A1 | | 6/2018 |
|---|---|---|---|
| JP | 2010-202855 A | | 9/2010 |
| JP | 2010-202856 A | | 9/2010 |
| JP | 2014-034673 | * | 2/2014 |
| JP | 2014-034673 A | | 2/2014 |
| WO | 2010/055839 A1 | | 5/2010 |
| WO | 2011/118520 A1 | | 9/2011 |
| WO | 2013/137140 A1 | | 9/2013 |
| WO | 2013/176102 A1 | | 11/2013 |

OTHER PUBLICATIONS

International Preliminary Report on Patentability dated Aug. 7, 2018 from the International Bureau in counterpart International application No. PCT/JP2017/003998.
Communication dated Jul. 31, 2020, from the State Intellectual Property Office of the P.R.C in Chinese application No. 201780009525.3.
Communication dated Aug. 4, 2020, from the Japanese Patent Office in Japanese application No. 2017-565651.
Office Action dated Jan. 22, 2020 from the Korean Patent Office in Korean Application No. 10-2018-7024559.
Communication dated Mar. 31, 2020, from the European Patent Office in EP Application No. 17747564.7.
Extended European Search Report dated Jul. 22, 2019, from the European Patent Office in corresponding European Application No. 17747564.7.

* cited by examiner

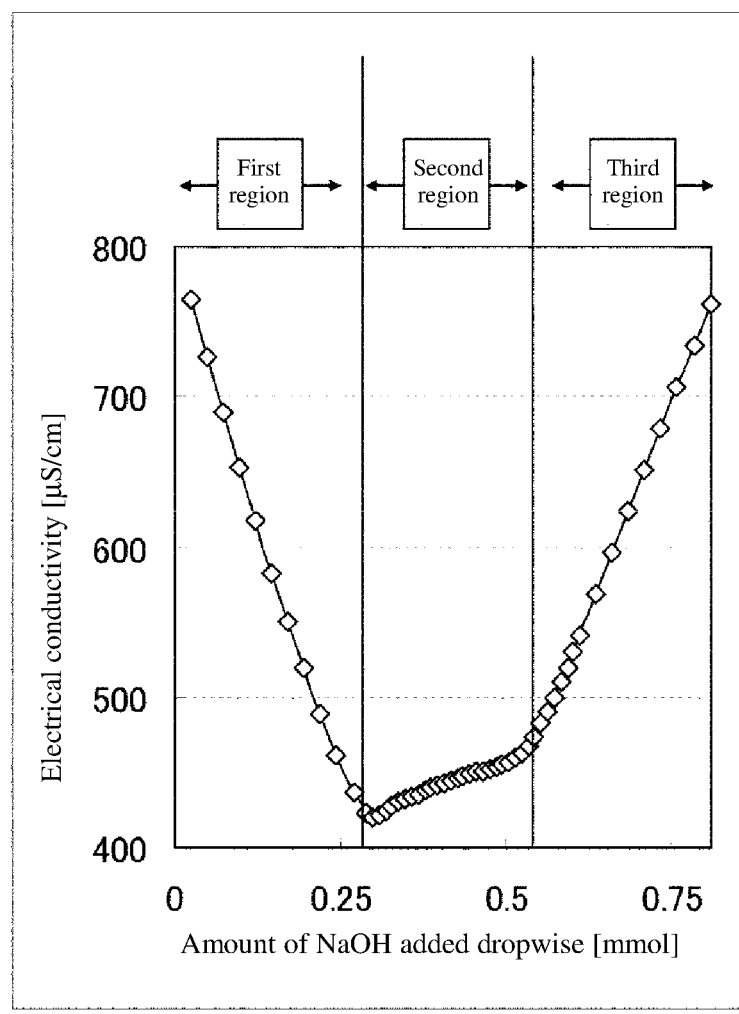

RESIN COMPOSITE AND METHOD FOR PRODUCING RESIN COMPOSITE

CROSS REFERENCE TO RELATED APPLICATIONS

This application is a National Stage of International Application No. PCT/JP2017/003998, filed on Feb. 3, 2017, which claims priority from Japanese Patent Application No. 2016-018688, filed on Feb. 3, 2016.

TECHNICAL FIELD

The present invention relates to a resin composite and a method for producing a resin composite.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 µm or more and 50 µm or less, in particular, wood-derived cellulose fibers (pulp) have been widely used mainly as paper products so far.

Ultrafine cellulose fibers, which have a fiber diameter of 1 µm or less, have also been known as cellulose fibers. In addition, a sheet composed of such ultrafine cellulose fibers, and a composite sheet comprising ultrafine cellulose fibers and a resin component have been developed. Since the contacts of fibers are significantly increased in a sheet or a composite sheet that contains ultrafine cellulose fibers, it has been known that tensile strength and the like are significantly improved in such a sheet or a composite sheet. Moreover, it has also been known that since the fiber width becomes shorter than the wavelength of a visible light, the transparency is significantly improved.

For example, Patent Document 1 discloses a gas barrier layer comprising ultrafine cellulose fibers and a water-soluble polymer such as polyvinyl alcohol. This document has reported that a composite of the ultrafine cellulose fibers and the water-soluble polymer exerts high gas barrier properties even under a high-humidity environment. Also, Patent Document 2 discloses a composite comprising at least one of ultrafine cellulose fibers, a resin, a metal oxide and a flake-like inorganic material. In Examples of Patent Document 2, an epoxy resin or a phenol resin is used as the resin, and Examples using such a resin and the flake-like inorganic material in combination are disclosed in the document.

PRIOR ART DOCUMENTS

Patent Documents

Patent Document 1: International Publication No. WO 2011/118520
Patent Document 2: International Publication No. WO 2010/055839

SUMMARY OF INVENTION

Object to be Solved by the Invention

As mentioned above, it has been proposed to improve mechanical properties or the like by forming a resin composite comprising ultrafine cellulose fibers and a resin. However, the studies of the present inventors have revealed that conventional resin composites comprising ultrafine cellulose fibers and a resin may not exert sufficient strength when placed under wet conditions.

It has also been considered that in a resin composite comprising ultrafine cellulose fibers mixed with a resin, water resistance is improved because the ultrafine cellulose fibers, which have high hydrophilicity, are coated with the resin. However, the studies of the present inventors have revealed that sufficient water resistance cannot be obtained in such a resin composite.

Accordingly, in order to solve such problems of the prior art, the present inventors have conducted studies with the aim of providing a resin composite that is excellent in water resistance and is capable of exerting sufficient strength even under wet conditions.

Means for Solving the Object

As a result of intensive studies in order to solve the aforementioned problem, the present inventors have found that the water resistance of a resin composite can be improved by allowing the resin composite to contain fibers having a particular functional group, a resin and a polyvalent ion. The present inventors have further found that such a resin composite is capable of exerting sufficient strength even under wet conditions, reaching the completion of the present invention.

Specifically, the present invention is configured as follows:

[1] A resin composite comprising a resin, fibers having an ionic functional group, and a polyvalent ion.
[2] The resin composite according to [1], wherein the fibers are cellulose fibers having a fiber width of 1000 nm or less.
[3] The resin composite according to [1] or [2], wherein the ionic functional group is an anionic functional group.
[4] The resin composite according to any one of [1] to [3], wherein the ionic functional group is a phosphoric acid group.
[5] The resin composite according to any one of [1] to [4], wherein the polyvalent ion is a metal ion.
[6] The resin composite according to any one of [1] to [5], wherein the resin is a hydrophilic resin.
[7] The resin composite according to any one of [1] to [6], wherein when the mass of the resin composite immersed in ion-exchanged water for 24 hours is defined as E and the mass of the resin composite left to stand for 24 hours under conditions of 23° C. and a relative humidity of 50% is defined as F, the water absorption rate represented by (E−F)/F×100 is 500% or less.
[8] The resin composite according to any one of [1] to [7], wherein when the area of the resin composite immersed in ion-exchanged water for 24 hours is defined as G and the area of the resin composite left to stand for 24 hours under conditions of 23° C. and a relative humidity of 50% is defined as H, the rate of expansion and contraction represented by G/H×100 is 130% or less.
[9] The resin composite according to any one of [1] to [8], wherein the resin composite is a sheet.
[10] The resin composite according to any one of [1] to [9], wherein in the case of measuring the concentrations of the fibers having an ionic functional group contained in the following regions (a) to (c), the fiber concentration ratio between two regions is less than 2:
(a) a region from one surface of the resin composite to 10% of the overall thickness of the resin composite,
(b) a region from the other surface of the resin composite to 10% of the overall thickness of the resin composite, and (c) a region from the center plane in the thickness direction of the resin composite to ±5% (a total of 10%) of the overall thickness.

[11] The resin composite according to any one of [1] to [10], wherein the tensile strength of the resin composite immersed in ion-exchanged water for 24 hours is 5 MPa or more.

[12] The resin composite according to any one of [1] to [11], wherein when the tensile strength of the resin composite immersed in ion-exchanged water for 24 hours is defined as A and the tensile strength of the resin composite left to stand for 24 hours under conditions of 23° C. and a relative humidity of 50% is defined as B, the residual rate of the tensile strength represented by A/B×100 is 9% or more.

[13] The resin composite according to any one of [1] to [12], wherein the tensile elastic modulus of the resin composite immersed in ion-exchanged water for 24 hours is 0.2 GPa or more.

[14] The resin composite according to any one of [1] to [13], wherein when the tensile elastic modulus of the resin composite immersed in ion-exchanged water for 24 hours is defined as C and the tensile elastic modulus of the resin composite left to stand for 24 hours under conditions of 23° C. and a relative humidity of 50% is defined as D, the residual rate of the tensile elastic modulus represented by C/D×100 is 3% or more.

[15] The resin composite according to any one of [1] to [14], wherein the resin composite is substantially free from lignophenol and lignophenol derivatives.

[16] A method for producing a resin composite, comprising:
  forming a composite by mixing a resin with fibers having an ionic functional group; and
  applying a polyvalent ion-containing solution after forming the composite.

[17] The method for producing a resin composite according to [16], wherein the polyvalent ion-containing solution is an aqueous solution of an inorganic metal salt.

Advantageous Effects of Invention

According to the present invention, a resin composite that is excellent in water resistance and is capable of exerting sufficient strength even under wet conditions can be obtained.

BRIEF DESCRIPTION OF DRAWING

FIG. 1 is a graph showing the relationship between the amount of NaOH added dropwise to a fiber raw material and electrical conductivity.

EMBODIMENT OF CARRYING OUT THE INVENTION

Hereinafter, the present invention will be described in detail. The description for components described below will be based on representative embodiments or specific examples; however, the present invention will not be limited to such embodiments.

(Resin Composite)

The present invention relates to a resin composite comprising a resin, fibers having an ionic functional group, and a polyvalent ion. In the present invention, a resin composite that is excellent in water resistance can be obtained by further adding a polyvalent ion to a resin and fibers having an ionic functional group.

In the resin composite of the present invention, it is believed that a structure poorly soluble or insoluble in water is formed through the interaction between the charge of the ionic functional group in the fibers and the charge of the polyvalent ion, and such a structure reduces the hydrophilicity of the resin composite, thereby conferring water resistance. In addition, the resin composite of the present invention has the above-described structure; therefore, the resin composite can exert sufficient strength even under wet conditions.

The form of the resin composite of the present invention is not particularly limited, but it can be, for example, a sheet, fibers, a foam, or a massive molded body. Among them, the resin composite of the present invention is preferably a sheet or fibers, and more preferably a sheet.

The resin composite of the present invention can exert sufficient strength even under wet conditions. The tensile strength of the resin composite under wet conditions is preferably 5 MPa or more, more preferably 8 MPa or more, further preferably 10 MPa or more, even further preferably 20 MPa or more, and particularly preferably 25 MPa or more. The upper limit value of the tensile strength of the resin composite under wet conditions is not particularly limited, but it can be, for example, 500 MPa or less. It is to be noted that the tensile strength under wet conditions is tensile strength after the resin composite is immersed in ion-exchanged water for 24 hours and redundant water remaining on the surface is wiped off. In the case where the resin composite is a sheet, the tensile strength of the resin composite under wet conditions is a value measured in accordance with JIS P 8135 using a tensile tester Tensilon (manufactured by A & D Co., Ltd.).

In this context, since the tensile strength under wet conditions is measured after the resin composite is immersed in ion-exchanged water for 24 hours and then pulled up by holding both ends of one side, it allows the resin composite to be pulled up after the immersion in ion-exchanged water. The tensile strength of the resin composite that cannot be pulled up and is broken after being immersed in ion-exchanged water cannot be measured, and it is anticipated that the tensile strength is close to 0 MPa.

The tensile strength of the resin composite of the present invention under humidity conditioning (dry) conditions is preferably 50 MPa or more, more preferably 70 MPa or more, and further preferably 100 MPa or more. The upper limit value of the tensile strength of the resin composite under humidity conditioning (dry) conditions is not particularly limited, but it can be, for example, 1000 MPa or less. It is to be noted that the tensile strength under humidity conditioning conditions is tensile strength after the resin composite is placed under conditions of 23° C. and a relative humidity of 50%. In the case where the resin composite is a sheet, the tensile strength of the resin composite under humidity conditioning conditions is a value measured in accordance with JIS P 8113 using a tensile tester Tensilon (manufactured by A & D Co., Ltd.).

In the present invention, the difference between the tensile strength of the resin composite under wet conditions and the tensile strength of the resin composite under humidity conditioning (dry) conditions is preferably small. The wet conditions are conditions that involve immersing the resin composite in ion-exchanged water for 24 hours, and the dry conditions (humidity conditioning conditions) are conditions that involve leaving the resin composite to stand for 24 hours under conditions of 23° C. and a relative humidity of 50%. In the present invention, in the case where the resin composite is a sheet, when the tensile strength of the resin composite immersed in ion-exchanged water for 24 hours is defined as A and the tensile strength of the resin composite left to stand for 24 hours under conditions of 23° C. and a relative humidity of 50% is defined as B, the residual rate (%) of the tensile strength is a value of A/B×100. The residual rate (%) of the tensile strength is preferably 9% or more, more preferably 20% or more, further preferably 30% or more, and particularly preferably 35% or more. The upper limit value of the residual rate (%) of the tensile strength is not particularly limited, but it can be, for example, 95% or less. The residual rate (%) of the tensile strength within the above-described range means that the resin composite is capable of retaining good mechanical properties even under wet conditions.

The tensile elastic modulus of the resin composite of the present invention under wet conditions is preferably 0.2 GPa or more, more preferably 0.5 GPa or more, further preferably 1 GPa or more, and even further preferably 2 GPa or more. The upper limit value of the tensile elastic modulus of the resin composite under wet conditions is not particularly limited, but it can be, for example, 50 GPa or less. In the case where the resin composite is a sheet, the tensile elastic modulus of the resin composite under wet conditions is a value measured in accordance with JIS P 8135 using a tensile tester Tensilon (manufactured by A & D Co., Ltd.).

It is to be noted that the tensile elastic modulus of the resin composite that cannot be pulled up and is broken after being immersed in ion-exchanged water cannot be measured, and it is anticipated that the tensile elastic modulus is close to 0 GPa.

The tensile elastic modulus of the resin composite of the present invention under humidity conditioning (dry) conditions is preferably 3 GPa or more, more preferably 5 GPa or more, further preferably 7 GPa or more, and even further preferably 9 GPa or more. The upper limit value of the tensile strength of the resin composite under humidity conditioning (dry) conditions is not particularly limited, but it can be, for example, 100 GPa or less. In the case where the resin composite is a sheet, the tensile elastic modulus of the resin composite under humidity conditioning conditions is a value measured in accordance with JIS P 8113 using a tensile tester Tensilon (manufactured by A & D Co., Ltd.).

In the present invention, the difference between the tensile elastic modulus of the resin composite under wet conditions and the tensile elastic modulus of the resin composite under dry conditions (humidity conditioning conditions) is preferably small. In the present invention, in the case where the resin composite is a sheet, when the tensile elastic modulus of the resin composite immersed in ion-exchanged water for 24 hours is defined as C and the tensile elastic modulus of the resin composite left to stand for 24 hours under conditions of 23° C. and a relative humidity of 50% is defined as D, the residual rate (%) of the tensile elastic modulus is a value of C/D×100. The residual rate (%) of the tensile elastic modulus is preferably 3% or more, more preferably 5% or more, further preferably 10% or more, even further preferably 20% or more, and particularly preferably 30% or more. The upper limit value of the residual rate (%) of the tensile elastic modulus is not particularly limited, but it can be, for example, 95% or less. The residual rate (%) of the tensile elastic modulus within the above-described range means that the resin composite is capable of retaining good mechanical properties even under wet conditions.

The resin composite of the present invention has a small water absorption rate. In the present invention, the small water absorption rate of the resin composite means excellent water resistance. In the present invention, when the mass of the resin composite immersed in ion-exchanged water for 24 hours is defined as E and the mass of the resin composite left to stand for 24 hours under conditions of 23° C. and a relative humidity of 50% is defined as F, the water absorption rate (%) is a value represented by (E−F)/F×100. The water absorption rate is preferably 1000% or less, more preferably 500% or less, further preferably 400% or less, even further preferably 300% or less, and particularly preferably 200% or less. It is to be noted that the water absorption rate of the resin composite may be 0%.

A further feature of the resin composite of the present invention is that the rate of expansion and contraction is suppressed. In the present invention, the small rate of expansion and contraction of the resin composite means that the swelling of the resin composite is suppressed when the resin composite is placed under wet conditions. In the present invention, when the area of the resin composite immersed in ion-exchanged water for 24 hours is defined as G and the area of the resin composite left to stand for 24 hours under conditions of 23° C. and a relative humidity of 50% is defined as H, the rate (%) of expansion and contraction is a value represented by G/H×100. The rate of expansion and contraction is preferably 140% or less, more preferably 130% or less, and further preferably 120% or less. The rate of expansion and contraction of the resin composite may be 100%. It is to be noted that when the rate of expansion and contraction is 100%, it means that the resin composite does not swell.

When the resin composite of the present invention is in a form other than a sheet, the strength or the like of, for example, fibers, is measured by a method in accordance with JIS L 1013, etc. or a method equivalent thereto, and the strength or the like of a polyethylene foam is measured by a method in accordance with JIS K 6767, etc. or a method equivalent thereto.

(Fibers Having Ionic Functional Group)

The resin composite of the present invention has fibers having an ionic functional group. Examples of the fibers having an ionic functional group include cellulose fibers, chitin fibers, chitosan fibers, surface-hydrophilized carbon nanofibers and the like.

The fibers having an ionic functional group are preferably cellulose fibers, and more preferably cellulose fibers having a fiber width of 1000 nm or less (which, hereinafter, may also be referred to as ultrafine cellulose fibers).

The content of the fibers having an ionic functional group is preferably 5% by mass or more, more preferably 10% by mass or more, further preferably 20% by mass or more, and particularly preferably 30% by mass or more based on the overall mass of the resin composite. The content of the fibers having an ionic functional group is preferably 99% by mass or less, more preferably 95% by mass or less, and further preferably 90% by mass or less.

In the resin composite of the present invention, the fibers having an ionic functional group are preferably dispersed in the resin composite, and more preferably uniformly dispersed. That is, the fibers having an ionic functional group work as reinforcing fibers in the resin composite. In this context, the state where the fibers having an ionic functional group are uniformly dispersed in the resin composite refers to a state where in the case of measuring the concentrations of the fibers having an ionic functional group contained in the following regions (a) to (c), the fiber concentration ratio between two regions is less than 2, i.e., a state where the concentrations of any two regions do not differ by 2 or more times when compared:

(a) a region from one surface of the resin composite to 10% of the overall thickness of the resin composite, (b) a region from the other surface of the resin composite to 10% of the overall thickness of the resin composite, and
(c) a region from the center plane in the thickness direction of the resin composite to ±5% (a total of 10%) of the overall thickness.

In the present invention, since the fibers having an ionic functional group are uniformly dispersed in the resin composite, the tensile strength of the resin composite under wet conditions is high and the aforementioned residual rate (%) of the tensile strength is also kept high. Furthermore, since the fibers having an ionic functional group are uniformly dispersed in the resin composite, the tensile elastic modulus of the resin composite under wet conditions is high and the aforementioned residual rate (%) of the tensile elastic modulus is also kept high.

The fibers having an ionic functional group are preferably ultrafine cellulose fibers, and the ultrafine cellulose fibers are preferably substantially free from lignophenol and lignophenol derivatives. That is, the resin composite of the present invention is preferably substantially free from lignophenol and lignophenol derivatives. If lignophenol and lignophenol derivatives remain in the resin composite, it is predicted that water resistance is enhanced due to their hydrophobic properties, whereas it is difficult to impregnate cellulose fibers with a compound for introducing an ionic functional group. As a result, the cellulose fibers are made insufficiently ultrafine. In one embodiment of the present invention, the fibers having an ionic functional group are preferably made sufficiently ultrafine, and the refining of cellulose fibers and improvement in water resistance can both be achieved.

It is to be noted that as used herein, the state where the resin composite is substantially free from lignophenol and lignophenol derivatives means that the content of lignophenol and lignophenol derivatives is 1% or less based on the overall mass of the resin composite.

<Ultrafine Cellulose Fibers>

Although there is no particular restriction on a cellulose fiber raw material for yielding ultrafine cellulose fibers, pulp is preferably used from the viewpoint of availability and inexpensiveness. The pulp may be selected from wood pulp, non-wood pulp, and deinked pulp. Examples of wood pulp include chemical pulp, such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulp, such as semi-chemical pulp (SCP), and chemi-ground wood pulp (CGP); and mechanical pulp, such as ground pulp (GP), and thermomechanical pulp (TMP, BCTMP). Examples of non-wood pulp include, but not particularly limited to, cotton pulp, such as cotton linter, and cotton lint; non-wood type pulp, such as hemp, wheat straw, and bagasse; and cellulose isolated from ascidian, seaweed, etc., chitin, chitosan and the like. As a deinked pulp, there is deinked pulp using waste paper as a raw material, but it is not particularly limited thereto. The pulp types according to this embodiment may be used singly, or in combination of two or more types. Among the above-listed pulp types, wood pulp and deinked pulp including cellulose are preferred from the viewpoint of easy availability. Among wood pulp, chemical pulp is preferred because the same has a higher cellulose content to enhance the yield of ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected. A resin composite containing the ultrafine cellulose fibers having a long fiber length with a high aspect ratio tends to exhibit a high strength.

The average fiber width of the ultrafine cellulose fibers is 1000 nm or less as observed with an electron microscope. The average fiber width is preferably 2 nm or more and 1000 nm or less, more preferably 2 nm or more and 100 nm or less, even more preferably 2 nm or more and 50 nm or less, and further preferably 2 nm or more and 10 nm or less, but is not particularly limited thereto. When the average fiber width of the ultrafine cellulose fibers is less than 2 nm, since they are dissolved in water as cellulose molecules, there appears tendency that the physical properties (strength, rigidity, and dimensional stability) as ultrafine cellulose fibers are not expressed sufficiently. It is to be noted that the ultrafine cellulose fibers are, for example, monofibrous cellulose having a fiber width of 1000 nm or less.

The measurement of a fiber width of an ultrafine cellulose fiber by electron microscopic observation is carried out as follows. An aqueous suspension of ultrafine cellulose fibers having a concentration of 0.05% by mass or more and 0.1% by mass or less is prepared, and the suspension is casted onto a hydrophilized carbon film-coated grid as a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.
(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in each image. At least 120 fiber widths (20 fibers×2×3=120) are thus read. The average fiber width (which may simply be referred to as a "fiber width") of ultrafine cellulose fibers is an average value of the fiber widths thus read.

The fiber length of the ultrafine cellulose fibers is not particularly limited, but it is preferably 0.1 μm or more and 1000 μm or less, more preferably 0.1 μm or more and 800 μm or less, and particularly preferably 0.1 μm or more and 600 μm or less. By making the fiber length within the above-described range, destruction of the crystalline region of the ultrafine cellulose fibers may be suppressed, and the slurry viscosity of the ultrafine cellulose fibers may also be set within an appropriate range. It is to be noted that the fiber length of the ultrafine cellulose fibers can be obtained by an image analysis using TEM, SEM or AFM.

The ultrafine cellulose fibers preferably have a type I crystal structure. In this context, the fact that the ultrafine cellulose fibers have a type I crystal structure may be identified by a diffraction profile obtained from a wide angle X-ray diffraction photograph using CuKα (λ=1.5418 Å) monochromatized with graphite. Specifically, it may be identified based on the fact that there are typical peaks at two positions near 2θ=14° or more and 17° or less, and near 2θ=22° or more and 23° or less.

The percentage of the type I crystal structure occupied in the ultrafine cellulose fibers is preferably 30% or more, more preferably 50% or more, and further preferably 70% or more.

The rate of a crystal portion comprised in the ultrafine cellulose fibers is not particularly limited in present invention, but it is preferable to use cellulose, in which the crystallinity obtained by an X-ray diffractometry is 60% or more. The crystallinity is preferably 65% or more, and more preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

In the present invention, the ultrafine cellulose fibers are fibers having an ionic functional group, and the ionic functional group is preferably an anionic functional group (which, hereinafter, may also be referred to as an anionic group). The anionic group is preferably at least one selected from, for example, a phosphoric acid group or a substituent derived from a phosphoric acid group (which may simply be referred to as a phosphoric acid group), a carboxyl group or a substituent derived from a carboxyl group (which may simply be referred to as a carboxyl group), and a sulfone group or a substituent derived from a sulfone group (which may simply be referred to as a sulfone group), more preferably at least one selected from a phosphoric acid group and a carboxyl group, and particularly preferably a phosphoric acid group.

The ultrafine cellulose fibers preferably have phosphoric acid groups or substituents derived from the phosphoric acid group. The phosphoric acid group is a divalent functional group corresponding to a phosphoric acid from which a hydroxyl group is removed. Specifically, it is represented by —$PO_3H_2$. The substituents derived from the phosphoric acid group include substituents, such as groups that phosphoric acid groups are condensation-polymerized into, salts of the phosphoric acid group and phosphoric acid ester groups, and they may be an ionic substituent or nonionic substituent.

In the present invention, the phosphoric acid group or a substituent derived from the phosphoric acid group may be a substituent represented by Formula (1) below:

[Formula 1]

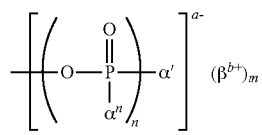

(1)

In Formula (1), a, b, m and n each independently represent an integral number (provided that a=b×m); $α^n$ (n is an integral number from 1 to n) and α' each independently represent R or OR. R is a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative group thereof; β is a monovalent or higher valent cation consisting of organic matter or inorganic matter.

<Phosphoric Acid Group Introduction Step>

The phosphoric acid group introduction step may be performed by allowing at least one selected from a compound having phosphoric acid groups and salts thereof (hereinafter, referred to as a "phosphorylating reagent" or "compound A") to react with the fiber raw material including cellulose. Such a phosphorylating reagent may be mixed into the fiber raw material in a dry or wet state, in the form of a powder or an aqueous solution. In another example, a powder or an aqueous solution of the phosphorylating reagent may be added into slurry of the fiber raw material.

The phosphoric acid group introduction step may be performed by allowing at least one selected from a compound having phosphoric acid groups and salts thereof (a phosphorylating reagent or compound A) to react with the fiber raw material including cellulose. It is to be noted that this reaction may be performed in the presence of at least one selected from urea and derivatives thereof (hereinafter, referred to as "compound B").

One example of the method for allowing compound A to act on the fiber raw material in the presence of compound B includes a method of mixing the fiber raw material in a dry or wet state with a powder or an aqueous solution of compound A and compound B. Another example thereof includes a method of adding a powder or an aqueous solution of compound A and compound B to slurry of the fiber raw material. Among them, a method of adding an aqueous solution of compound A and compound B to the fiber raw material in a dry state, or a method of adding a powder or an aqueous solution of compound A and compound B to the fiber raw material in a wet state is preferred because of the high homogeneity of the reaction. Compound A and compound B may be added at the same time or may be added separately. Alternatively, compound A and compound B to be subjected to the reaction may be first added as an aqueous solution, which is then compressed to squeeze out redundant chemicals. The form of the fiber raw material is preferably a cotton-like or thin sheet form, though the form is not particularly limited thereto.

The compound A used in the present embodiment is at least one selected from a compound having phosphoric acid groups and salts thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferred. Sodium dihydrogenphosphate, or disodium hydrogenphosphate is more preferred.

Further, since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably 7 or lower because the efficiency in introduction of a phosphoric acid group is high, and more preferably 3 to 7 from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the quantitative ratio thereof. The pH of an aqueous solution of Compound A may also be adjusted by adding an inorganic alkali or an organic alkali to an acidic compound among compounds having a phosphoric acid group.

The amount of the compound A added to the fiber raw material is not particularly limited, but when the amount of the compound A added is converted to the amount of phosphorus atoms, the amount of phosphorus atoms added to the fiber raw material (absolute dry mass) is preferably 0.5% by mass or more and 100% by mass or less, more preferably 1% by mass or more and 50% by mass or less, and the most preferably 2% by mass or more and 30% by mass or less. When the amount of phosphorus atoms added to the fiber raw material is within the above range, the yield of ultrafine cellulose fibers may be more improved. When the amount of phosphorus atoms added to the fiber raw material exceeds 100% by mass, the effect of improving the yield levels off, and the cost of the Compound A used increases. On the other hand, by adjusting the amount of phosphorus atoms added to the fiber raw material not less than the lower limit, the yield may be increased.

Examples of the compound B used in the present embodiment include urea, biuret, 1-phenyl urea, 1-benzyl urea, 1-methyl urea, 1-ethyl urea and the like.

The compound B, as with the compound A, is preferably used as an aqueous solution. An aqueous solution containing both of the compound A and the compound B dissolved therein is preferably used because of the enhanced homogeneity of the reaction. The amount of the compound B added to the fiber raw material (absolute dry mass) is preferably 1% by mass or more and 500% by mass or less, more preferably 10% by mass or more and 400% by mass or less, further preferably 100% by mass or more and 350% by mass or less, and particularly preferably 150% by mass or more and 300% by mass or less.

The reaction system may contain an amide or an amine in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferred to perform heat treatment. For the temperature of heat treatment, it is preferred to select a temperature that allows an efficient introduction of phosphoric acid groups while suppressing the thermal decomposition or hydrolysis reaction of fibers. Specifically, the temperature is preferably 50° C. or more and 300° C. or less, more preferably 100° C. or more and 250° C. or less, and further preferably 130° C. or more and 200° C. or less. In addition, a vacuum dryer, an infrared heating device, or a microwave heating device may be used for heating.

Upon heat treatment, if the time for leaving the fiber raw material to stand still gets longer while the fiber raw material slurry to which the compound A is added contains water, as drying advances, water molecules and the compound A dissolved therein move to the surface of the fiber raw material. As such, there is a possibility of the occurrence of unevenness in the concentration of the compound A in the fiber raw material, and the introduction of phosphoric acid groups to the fiber surface may not progress uniformly. In order to suppress the occurrence of unevenness in the concentration of the compound A in the fiber raw material due to drying, the fiber raw material in the shape of a very thin sheet may be used, or a method may be employed of heat drying or vacuum drying the fiber raw material while kneading or stirring with the compound A using a kneader or the like.

As a heating device used for heat treatment, a device capable of always discharging moisture retained by slurry or moisture generated by an addition reaction of phosphoric acid groups with hydroxy groups of the fiber to the outside of the device system is preferred, and for example, forced convection ovens or the like are preferred. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although affected by the heating temperature, preferably 1 second or more and 300 minutes or less, more preferably 1 second or more and 1000 seconds or less, and further preferably 10 seconds or more and 800 seconds or less after moisture is substantially removed from the fiber raw material slurry. In the present invention, by setting the heating temperature and heating time within an appropriate range, the amount of phosphoric acid groups introduced can be set within a preferred range.

The amount of phosphoric acid groups introduced is, per 1 g (mass) of the ultrafine cellulose fibers, preferably 0.1 mmol/g or more and 3.65 mmol/g or less, more preferably 0.14 mmol/g or more and 3.5 mmol/g or less, further preferably 0.2 mmol/g or more and 3.2 mmol/g or less, particularly preferably 0.4 mmol/g or more and 3.0 mmol/g or less, and the most preferably 0.6 mmol/g or more and 2.5 mmol/g or less. By setting the amount of phosphoric acid groups introduced within the above-described range, it may become easy to make the fiber raw material ultrafine, and the stability of the ultrafine cellulose fibers can be enhanced. In addition, by making the amount of phosphoric acid groups introduced within the above-described range, although it is easy to make the fiber raw material ultrafine, the hydrogen bonds between the ultrafine cellulose fibers may also remain, and the expression of good strength can be expected.

The amount of phosphoric acid groups introduced into a fiber raw material may be measured by a conductometric titration method. Specifically, the amount introduced may be measured by performing fibrillation on ultrafine fibers in a defibration treatment step, treating the resulting slurry comprising ultrafine cellulose fibers with an ion exchange resin, and then examining a change in the electrical conductivity while adding an aqueous sodium hydroxide solution.

The conductometric titration confers a curve shown in FIG. 1 as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). In short, three regions appear. It is to be noted that the boundary point between the second region and the third region is defined as a point at which the second-order differential value of the conductivity, i.e., the amount of change in the increment (slope) of the conductivity, is maximized. The amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "the amount of the phosphoric acid group introduced (or the amount of the phosphoric acid group)" or "the amount of the substituent introduced (or the amount of the substituent)" refers to the amount of the strongly acidic group. Specifically, the amount (mmol) of the alkali required for the first region in the curve shown in FIG. 1 is divided by the solid content (g) in the slurry to be titrated to determine the amount (mmol/g) of substituents introduced.

The phosphoric acid group introduction step may be performed at least once, but may be repeated multiple times as well. This case is preferred since more phosphoric acid groups are introduced.

<Introduction of Carboxyl Groups>

In the present invention, when the ultrafine cellulose fibers have carboxyl groups, they can be introduced to the fibers by oxidation treatment, such as the TEMPO oxidation treatment, or treatment using a compound having groups derived from a carboxylic acid, derivatives, or acid anhydrides or derivatives thereof.

Although there is no particular restriction on a compound having a carboxyl group, examples thereof include a dicarboxylic acid compound, such as maleic acid, succinic acid, phthalic acid, fumaric acid, glutaric acid, adipic acid, and itaconic acid, and a tricarboxylic acid compound, such as citric acid, and aconitic acid.

Although there is no particular restriction on an acid anhydride of a compound having a carboxyl group, examples thereof include an acid anhydride of a dicarboxylic acid compound, such as maleic anhydride, succinic anhydride, phthalic anhydride, glutaric anhydride, adipic anhydride, and itaconic anhydride.

Although there is no particular restriction on a derivative of a compound having a carboxyl group, examples thereof include an imide of an acid anhydride of a compound having a carboxyl group, and a derivative of an acid anhydride of a compound having a carboxyl group. Although there is no particular restriction on the imide of an acid anhydride of a compound having a carboxyl group, examples thereof include an imide of a dicarboxylic acid compound, such as maleimide, succinimide, and phthalimide.

There is no particular restriction on a derivative of an acid anhydride of a compound having a carboxyl group. Examples thereof include an acid anhydride of a compound having a carboxyl group, at least a part of the hydrogen atoms of which is substituted with a substituent (e.g. an alkyl group, and a phenyl group), such as dimethylmaleic anhydride, diethylmaleic anhydride, and diphenylmaleic anhydride.

<Amount of Carboxyl Groups Introduced>

The amount of carboxyl groups introduced is, per 1 g (mass) of the ultrafine cellulose fibers, preferably 0.1 mmol/g or more, more preferably 0.2 mmol/g or more, further preferably 0.3 mmol/g or more, and particularly preferably 0.5 mmol/g or more. The amount of carboxyl groups introduced is also preferably 3.5 mmol/g or less, more preferably 3.0 mmol/g or less, further preferably 2.5 mmol/g or less, and particularly preferably 2.0 mmol/g or less. By setting the amount of carboxyl groups introduced within the above-described range, it may become easy to make the fiber raw material ultrafine, and the stability of the ultrafine cellulose fibers can be enhanced.

<Cationic Substituent Introduction>

In this embodiment, a cationic substituent may be introduced into ultrafine cellulose fibers as an ionic substituent. For example, a cationic substituent may be introduced into a fiber raw material, by adding a cationizing agent and an alkaline compound to a fiber raw material and causing a reaction. As the cationizing agent, one having a group reactive with a quaternary ammonium group and a hydroxy group of cellulose may be used. Examples of the group reactive with a hydroxyl group of cellulose include an epoxy group, a functional group having a structure of halohydrin, a vinyl group, and a halogen group. Specific examples of the cationizing agent include a glycidyltrialkylammonium halide, such as glycidyltrimethylammonium chloride, and 3-chloro-2-hydroxypropyltrimethylammonium chloride, and a halohydrin form compound thereof.

The alkali compound contributes to promotion of a cationization reaction. The alkali compound may be an inorganic alkali compound, such as an alkali metal hydroxide, an alkaline earth metal hydroxide, an alkali metal carbonate, an alkaline earth metal carbonate, an alkali metal phosphate, an alkaline earth metal phosphate; or an organic alkali compound, such as ammonia, an aliphatic amine, an aromatic amine, an aliphatic ammonium, an aromatic ammonium, a heterocyclic compound and a hydroxide, a carbonate, a phosphate, etc. thereof. A measurement of an amount of a cationic substituent introduced may be carried out, for example, by an elemental analysis.

<Alkali Treatment>

In the case of producing the ultrafine cellulose fibers, alkali treatment may be performed between the phosphoric acid group introduction step and a defibration treatment step mentioned later. Examples of the alkali treatment method include, but are not particularly limited to, a method of immersing the phosphoric acid group-introduced fibers in an alkali solution.

There is no particular restriction on an alkali compound contained in the alkaline solution, and it may be an inorganic alkaline compound or an organic alkali compound. The solvent of the alkaline solution may be either of water and an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is especially preferred, because of their multiplicity of uses.

The temperature of the alkali solution in the alkali treatment step is not particularly limited, but it is preferably 5° C. or more and 80° C. or less and more preferably 10° C. or more and 60° C. or less.

The immersion time in the alkali solution in the alkali treatment step is not particularly limited, but it is preferably 5 minutes or more and 30 minutes or less and more preferably 10 minutes or more and 20 minutes or less.

The amount of the alkali solution used in the alkali treatment is not particularly limited, but it is preferably 100% by mass or more and 100000% by mass or less and more preferably 1000% by mass and 10000% by mass or less, with respect to the absolute dry mass of the phosphoric acid group-introduced fibers.

In order to reduce the consumption of an alkaline solution in the alkali treatment step, a phosphoric acid group-introduced fiber may be washed with water or an organic solvent before the alkali treatment step. After the alkali treatment, the alkali-treated phosphoric acid group-introduced fiber is preferably washed with water or an organic solvent before the defibration treatment step in order to improve the handling property.

<Defibration Treatment>

The phosphoric acid group-introduced fibers are subject to defibration treatment in a defibration treatment step. In the defibration treatment step, in general, using a defibration treatment device, the defibration treatment is performed on fibers, so as to obtain a slurry comprising ultrafine cellulose fibers. However, the treatment device and the treatment method are not particularly limited thereto.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and free from apprehension of contamination.

For the defibration treatment, the fiber raw material is preferably diluted into slurry using water and an organic solvent each alone or in combination, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

The slurry comprising ultrafine cellulose fibers of the present invention may be obtained by temporarily concentrating and/or drying a slurry comprising ultrafine cellulose fibers obtained by a defibration treatment and then performing a defibration treatment again. In this case, the method of concentration and drying is not particularly limited, but examples thereof include a method in which a concentrating agent is added into a slurry comprising ultrafine cellulose fibers, a method using a dehydrator, a press, or a dryer used generally, and the like. Further, publicly known methods, for example as described in WO 2014/024876, WO 2012/107642, and WO 2013/121086, may be used. Also, the slurry comprising ultrafine cellulose fibers may be formed into a sheet. It is also possible that the sheet may be, concentrated, dried, and subjected to a defibration treatment to obtain a slurry comprising ultrafine cellulose fibers again.

As a device used for performing a defibration (pulverization) treatment again after concentrating and/or drying an ultrafine cellulose fiber slurry, a high-speed defibrator, a grinder (stone mill-type grinder), a high-pressure homogenizer, an ultra-high pressure homogenizer, a high-pressure collision type crusher, a ball mill, a bead mill, a disk type refiner, a conical refiner, a twin screw kneader, a vibrating mill, a device for wet milling, such as a high-speed rotating homomixer, an ultrasonic disperser, and a beater, may be used without limitation thereto.

The material comprising ultrafine cellulose fibers with phosphoric acid groups, which has been obtained by the above-mentioned method, is a slurry comprising ultrafine cellulose fibers, and it may be diluted with water to a desired concentration.

(Polyvalent Ion)

The resin composite of the present invention comprises a polyvalent ion. The polyvalent ion is a cation having a valence of 2 or more or an anion having a valence of 2 or more. When the fibers having an ionic functional group have an anionic functional group, the polyvalent ion is preferably a cation having a valence of 2 or more. When the fibers having an ionic functional group have a cationic functional group, the polyvalent ion is preferably an anion having a valence of 2 or more.

The polyvalent ion is preferably a metal ion. The metal ion forms a closely packed structure among the polyvalent ions, and it is preferred because of easily forming a poorly soluble or insoluble structure in the resin composite. Examples of the metal ion may include, for example, a magnesium ion ($Mg^{2+}$), aluminum ion ($Al^{3+}$), calcium ion ($Ca^{2+}$), zinc ion ($Zn^{2+}$), iron ion ($Fe^{2+}$, $Fe^{3+}$), strontium ion ($Sr^{2+}$), barium ion ($Ba^{2+}$), cadmium ion ($Cd^{2+}$), nickel ion ($Ni^{2+}$), copper ion ($Cu^{2+}$), cobalt ion ($Co^{2+}$), tin ion ($Sn^{2+}$) and the like. Among them, the metal ion is preferably at least one selected from a magnesium ion, an aluminum ion and an iron ion, and more preferably an aluminum ion or a magnesium ion. Only one of these polyvalent ions may be used, or two or more thereof may be used in combination.

The metal ion as the polyvalent ion may be a complex ion. Examples of the complex ion may include, for example, a tetraammine zinc (II) ion ($[Zn(NH_3)_4]^{2+}$), a tetraammine copper (II) ion $[Cu(NH_3)_4]^{2+}$ and the like.

The polyvalent ion may be a polyvalent ion other than a metal ion. Examples of such polyvalent ions may include, for example, a sulfate ion ($SO_4^{2-}$), thiosulfate ion ($S_2O_3^{2-}$), sulfide ion ($S^{2-}$), carbonate ion ($CO_3^{2-}$), phosphate ion ($PO_4^{3-}$) and the like. Alternatively, the polyvalent ion may be cationic and/or anionic organic matter, and examples of the cationic and/or anionic organic matter may include polyamidoamine epichlorohydrin, polyacrylamide, chitosan, cationized starch, citric acid, polyacrylic acid, phosphoric acid-modified starch and the like.

The content of the polyvalent ion is preferably 0.01% by mass or more, more preferably 0.1% by mass or more, and further preferably 0.5% by mass or more based on the overall mass of the fibers having an ionic functional group contained in the resin composite. It is preferred to adjust the content of the polyvalent ion such that the ion valence is equal to the ion valence of the ionic functional group contained in the resin composite.

The content of the polyvalent ion contained in the resin composite can be measured by, for example, a fluorescent X-ray analysis method. In the case of performing quantification by a fluorescent X-ray analysis method, first, a sample that is similar in composition and form to a measurement target and has a known content (mmol) of an analytical element (for example, in the case where the resin composite is in a sheet form, the sample is filter paper or the like) is prepared for calibration curve preparation, and the X-ray intensity of the sample is measured by a fluorescent X-ray analysis. In this context, a divalent or higher metal becomes the analytical element. Subsequently, a calibration curve is prepared on the basis of the X-ray intensity thus obtained and the known content of the analytical element.

Then, the X-ray intensity of the measurement target is measured by the fluorescent X-ray analysis. Subsequently, the content (mmol) of the analytical element in the measurement target is measured from the X-ray intensity thus obtained and the above-described calibration curve. The obtained content of the analytical element in the measurement target is divided by the mass (g) of the measurement target to calculate the amount (mmol/g) of the divalent or higher metal introduced into the measurement target. In this context, the mass Z of the measurement target is calculated according to the following expression:

$$Z(g) = W(cm^2) \times X(g/cm^3) \times Y(cm)$$

(W: the area ($cm^2$) of the sheet used in the fluorescent X-ray analysis, X: the density ($g/cm^3$) of the sheet, Y: the thickness (cm) of the sheet)

Other examples of methods for quantifying the polyvalent ion may include ICP-atomic emission spectroscopy, ICP-mass spectrometry, atomic absorption analysis, ion chromatography and the like combined with an appropriate pretreatment. Also, an analysis method focused on a particular element contained in the polyvalent ion may be used. For example, the N atom of polyacrylamide can be quantified by a trace nitrogen analyzing device.

(Resin)

The resin composite of the present invention comprises a resin. Examples of the resin may include natural resins and synthetic resins. Alternatively, the resin may be a thermoplastic resin or may be a thermosetting resin.

Examples of natural resins may include, for example, rosin-based resins, such as rosin, rosin ester and hydrated rosin ester.

Examples of synthetic resins may include, for example, vinyl chloride, vinyl acetate, polystyrene, ABS resins, acrylic resins, polyethylene, polyethylene terephthalate, polyethylene naphthalate, polypropylene, fluorinated resins, polyamide resins, polyimide resins, polyacetal resins, polycarbonate, polylactic acid, polyglycolic acid, poly-3-hydroxybutylate, polyhydroxyvalerate, polyethylene adipate, polycaprolactone, polypropyllactone and other polyesters, polyethers such as polyethylene glycol, polyamides such as polyglutamic acid and polylysine, polyvinyl alcohol, polyurethane, phenol resins, epoxy resins and the like.

Also, as synthetic resins, cellulose-based resins such as carboxymethylcellulose, carboxyethylcellulose, hydroxymethylcellulose, hydroxyethylcellulose, or cellulose acetate are preferably used.

The resin used in the present invention is preferably a hydrophilic resin. The resin is more preferably a water-soluble resin. The hydrophilic resin herein refers to a resin having a SP value of 9.0 or more. Also, the hydrophilic resin herein refers to a resin that is dissolved in 1 g or more in 100 ml of ion-exchanged water. It is to be noted that the water-soluble resin refers to a resin that has a higher SP value and higher solubility in ion-exchanged water than those of the hydrophilic resin. The hydrophilic resin has high affinity for the fibers having an ionic functional group; therefore, it is preferably used.

Examples of the hydrophilic resin may include, for example, polyvinyl alcohol, polyurethane, carboxymethylcellulose, hydroxyethylcellulose, hydroxypropylcellulose, cellulose acetate, polyethylene glycol and the like. Among them, the hydrophilic resin is preferably polyvinyl alcohol. The polyvinyl alcohol has good affinity for the fibers having an ionic functional group, fills the interstices between the fibers, and can enhance the strength and flexibility of the resin composite.

The polyvinyl alcohol (PVA) is obtained by saponifying polyvinyl acetate. The saponification value of the polyvinyl alcohol is not particularly limited, but it is preferably 50% by mol or more, more preferably 60% by mol or more, and further preferably 70% by mol or more. The saponification value of the polyvinyl alcohol is preferably 95% by mol or less, more preferably 90% by mol or less, and further preferably 85% by mol or less. By setting the saponification value of the polyvinyl alcohol within the above-described range, the resin composite can have more effectively enhanced water resistance and can further exert sufficient strength even under wet conditions.

The average degree of polymerization of the polyvinyl alcohol is not particularly limited, but it is preferably 500 or more, more preferably 1000 or more, and further preferably 1500 or more. The average degree of polymerization of the polyvinyl alcohol is preferably 20000 or less, more preferably 10000 or less, and further preferably 5000 or less. By setting the average degree of polymerization of the polyvinyl alcohol within the above-described range, the resin composite can have more effectively enhanced water resistance and can further exert sufficient strength even under wet conditions.

The resin used in the present invention can also be called matrix resin. In this context, the matrix resin refers to a resin that is capable of binding to the intersections of the fibers having an ionic functional group, and refers to a resin that is present in a state spread throughout the resin composite. That is, in the resin composite of the present invention, the fibers having an ionic functional group and the polyvalent ion are preferably mixed into the matrix resin.

The content of the resin is preferably 1% by mass or more, more preferably 5% by mass or more, further preferably 10% by mass or more, and particularly preferably 30% by mass or more based on the overall mass of the resin composite. The content of the fibers having an ionic functional group is preferably 95% by mass or less.

The mass ratio of the resin (A) to the fibers (B) having an ionic functional group ((A)/(B)) contained in the resin composite is preferably within the range of 5/95 to 95/5, more preferably within the range of 30/70 to 95/5, and further preferably within the range of 50/50 to 90/10. By setting the mass ratio of the resin to the fibers having an ionic functional group within the above-described range, the strength of the resin composite can be enhanced, and the water resistance can be enhanced.

(Optional Component)

The resin composite may comprise optional components other than the aforementioned components. Examples of optional components may include, for example, antifoaming agents, lubricants, ultraviolet absorbing agents, dyes, pigments, stabilizers, surfactants and the like. As these optional components, a compound having an ionic functional group can be selected, and this can also form ionic bonds between the fibers having an ionic functional group and the optional components. In this case, the optional components and the fibers having an ionic functional group may have the same ionicity (cation-cation, anion-anion) or may have different ionicities (cation-anion).

(Method for Producing Resin Composite)

The present invention also relates to a method for producing a resin composite, comprising a step of forming a resin composite comprising a resin, fibers having an ionic functional group, and a polyvalent ion. For the method for producing a resin composite of the present invention, the following production methods can be adopted:

(1) a production method comprising a step of forming a resin composite from a resin composition obtained by mixing all of a resin, fibers having an ionic functional group, and a polyvalent ion;

(2) a production method comprising: a step of forming a composite by mixing a resin with fibers having an ionic functional group; and a step of applying a polyvalent ion-containing solution after the step of forming a composite; and (3) a production method comprising: a step of forming a base material from fibers having an ionic functional group; a step of applying a polyvalent ion-containing solution to the base material after the step of forming a base material; and a step of impregnating it with a resin.

Among them, it is preferred to adopt the production method of (2) for the method for producing a resin composite. That is, a production step of the resin composite of the present invention preferably includes a step of forming a composite by mixing a resin with fibers having an ionic functional group, and a step of applying a polyvalent ion-containing solution after the step of forming a composite. In the method for producing a resin composite of the present invention, by providing the step of applying a polyvalent ion-containing solution after the step of forming a composite, the aggregation of the fibers having an ionic functional group can be suppressed, and the uniform dispersibility of the fibers can be enhanced. In the resin composite, the uniform dispersion of the fibers is also important from the viewpoint of exerting the reinforcing effects of the fibers. When the fibers are uniformly dispersed in the resin composite, the tensile strength of the resin composite under wet conditions is enhanced, and the residual rate (%) of the tensile strength is also kept high. Furthermore, when the fibers are uniformly dispersed in the resin composite, the tensile elastic modulus of the resin composite under wet conditions is enhanced, and the residual rate (%) of the tensile elastic modulus is kept high.

It is to be noted that examples of the resin, the fibers having an ionic functional group, and the polyvalent ion for use in the method for producing a resin composite may include those mentioned above, and preferred ranges are also the same as above.

In the case of adopting the production method of (2) for the method for producing a resin composite, in the step of forming a composite by mixing a resin with fibers having an ionic functional group, the composite may be formed by applying a resin composition onto a base material, or the composite may be formed by papermaking from a resin composition. In the case of papermaking from a resin composition, an appropriate filter medium that yields the resin and the fibers having an ionic functional group is selected. Also, a latex, a powdery resin, a fibrous resin is preferably selected as the resin.

It is to be noted that for the production method of the present invention, it is preferred to form a composite by applying a resin composition onto a base material.

<Coating Step>

A coating step is a step of applying a resin composition containing a resin and fibers having an ionic functional group on a base material, drying the resin composition to form a sheet, and detaching the sheet from the base material to obtain a composite (which, hereinafter, may also be referred to as a fiber-resin composite sheet or a sheet). Use of a coating apparatus and a long base material can continuously produce fiber-resin composite sheets. In the case of using a resin composition containing a resin and fibers having an ionic functional group in the coating step, it is preferred to use a resin composition in which the resin and the fibers having an ionic functional group are mixed at a desired mass ratio. It is to be noted that as the resin for obtaining the resin composition, a resin solution having a concentration adjusted to 0.1% by mass or more and 10% by mass or less is preferably used, and as a solvent for the resin solution, an aqueous solution or water is preferably used.

The quality of the base material used in the coating step is not particularly limited. Although a base material having higher wettability to the resin composition is preferred because shrinkage of the sheet or the like upon drying is suppressed, it is preferred to select one from which a sheet formed after drying can be easily detached. Of these, a resin plate or a metal plate is preferred, without particular limitation. Examples thereof that can be used include resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of surface thereof; and stainless plates and brass plates.

When the resin composition has a low viscosity and spreads on the base material in the coating step, a damming frame is fixed and used on the base material in order to obtain a sheet having a predetermined thickness and basis weight. The quality of the damming frame is not particularly limited, and it is preferred to select ones from which edges of the sheet adhered after drying can be easily detached. Of these, frames formed from resin plates or metal plates are preferred, without particular limitation. Example thereof that can be used include frames formed from resin plates such as acrylic plates, polyethylene terephthalate plates, vinyl chloride plates, polystyrene plates, and polyvinylidene chloride plates; from metal plates such as aluminum plates, zinc plates, copper plates, and iron plates; from plates obtained by the oxidation treatment of surface thereof; and from stainless plates and brass plates.

Examples of a coater for applying a resin composition that can be used include roll coaters, gravure coaters, die coaters, curtain coaters, and air doctor coaters. Die coaters, curtain coaters, and spray coaters are preferred because more even thickness can be provided.

The coating temperature is not particularly limited, and is preferably 20° C. or more and 45° C. or less, more preferably 25° C. or more and 40° C. or less, still more preferably 27° C. or more and 35° C. or less. When the coating temperature is equal to or higher than the lower limit described above, it is possible to easily apply the resin composition. When the coating temperature is equal to or lower than the upper limit described above, it is possible to prevent volatilization of the dispersion medium upon coating.

In the coating step, it is preferred to apply the resin composition so as to achieve a finished basis weight of the sheet of 10 g/m² or more and 100 g/m² or less, preferably 20 g/m² or more and 50 g/m² or less. Applying the resin composition so as to achieve a basis weight within the above range can give a sheet having excellent strength.

A step of forming a composite preferably includes a step of drying the resin composition applied on the base material. The drying method is not particularly limited, and any of a contactless drying method and a method of drying the sheet while locking the sheet can be used, or these methods may be combined.

The contactless drying method is not particularly limited, and a method for drying by heating with hot air, infrared, far-infrared, or near-infrared (drying method by heating) or a method for drying in vacuum (vacuum drying method) can be utilized. Although the drying method by heating and the vacuum drying method may be combined, the drying method by heating is usually utilized. The drying with infrared, far-infrared, or near-infrared can be performed using an infrared apparatus, a far-infrared apparatus, or a near-infrared apparatus without particular limitations. The heating temperature for the drying method by heating is not particularly limited, and is preferably 20° C. or more and 150° C. or less, more preferably 25° C. or more and 105° C. or less. At the heating temperature equal to or higher than the lower limit described above, the dispersion medium can be rapidly volatilized. At the heating temperature equal to or lower than the upper limit described above, cost required for the heating can be reduced and the thermal discoloration of the ultrafine cellulose fibers can be suppressed.

<Papermaking Step>

The step of forming a composite by mixing a resin with fibers having an ionic functional group may include a step of papermaking from a resin composition. Examples of a paper machine in the papermaking step include continuous paper machines such as a Fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the resin composition is wire-filtered and dehydrated to obtain a sheet in a wet state. Then, the wet sheet is pressed and dried to obtain a sheet. Upon filtration and dehydration of a resin composition, filter fabric for filtration is not particularly limited. It is important that ultrafine cellulose fibers or resins do not pass through filter fabric and the filtration speed is not excessively slow. Such filter fabric is not particularly limited, and a sheet comprising organic polymers, woven fabric, or porous membrane is preferred. Preferred examples of organic polymers include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 μm or more and 20 μm or less, for example, 1 μm and woven fabric made of polyethylene terephthalate or polyethylene having a pore size of 0.1 μm or more and 20 μm or less, for example, 1 μm.

A method for producing a sheet from a resin composition is not particularly limited, and an example thereof is the method disclosed in WO 2011/013567 comprising using a production apparatus. The production apparatus comprises a dewatering section for ejecting a resin composition containing ultrafine cellulose fibers on the upper surface of an endless belt and dewatering a dispersion medium contained in the ejected resin composition to form a web and a drying section for drying the web to produce a fiber sheet. The endless belt is provided across from the dewatering section to the drying section, and the web formed in the dewatering section is transferred to the drying section while being placed on the endless belt.

A dehydration method that can be adopted is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, and an example thereof is a method used for paper production and for example a method using a cylinder dryer, a yankee dryer, hot air drying, a near-infrared heater, or an infrared heater is preferred.

<Step of Applying Polyvalent Ion-Containing Solution>

The method for producing a resin composite of the present invention preferably comprises a step of applying a polyvalent ion-containing solution after the step of forming a composite. In the step of applying a polyvalent ion-containing solution, the polyvalent ion-containing solution may be applied by spraying or the like to the composite containing the resin and the fibers having an ionic functional group. It is preferred to impregnate the composite with the polyvalent ion-containing solution.

The polyvalent ion-containing solution for use in the step of applying a polyvalent ion-containing solution can be any solution containing the aforementioned polyvalent ion, but it is preferably an aqueous solution of an inorganic metal salt containing the aforementioned metal species. The concentration of the inorganic metal salt contained in the polyvalent ion-containing solution is not particularly limited, but it is preferably 0.1% by mass or more and 10% by mass or less. When the step of applying a polyvalent ion-containing solution is an immersion step, the immersion time is not particularly limited, but it is preferably 1 minute or more and 120 minutes or less.

After the step of applying a polyvalent ion-containing solution, a washing step may be provided, and it is preferred to further provide a drying step. For the drying step, the same conditions as dry conditions in a step of obtaining a composite can be exemplified.

The resin composite is not limited by a sheet shape and may have a fiber shape or a foam shape. For example, a resin composition can be extruded into an appropriate coagulation liquid (for example, a poor solvent such as methanol) from a spinning nozzle, recovered, washed, etc. to produce a fiber-shaped resin composite. Examples of methods producing a foam from a resin composition, but are not particularly limited to, a production method described in WO 2013/146847.

(Laminate)

The present invention may relate to a laminate having a structure in which an additional layer is laminated on the resin composite. Such an additional layer may be provided on both surfaces of the resin composite or may be provided on one surface of the resin composite. Examples of the additional layer that is laminated on at least one surface of the resin composite may include, for example, a resin layer and an inorganic layer.

<Resin Layer>

A resin layer is a layer that has a natural resin or a synthetic resin as a main component. In this context, the main component refers to a component comprised in 50% by mass or more based on the overall mass of the resin layer. The content of the resin is preferably 60% by mass or more, more preferably 70% by mass or more, further preferably 80% by mass or more, and particularly preferably 90% by mass or more based on the overall mass of the resin layer. It is to be noted that the content of the resin may be 100% by mass or 95% by mass or less.

Examples of natural resins may include, for example, rosin-based resins, such as rosin, rosin ester and hydrated rosin ester.

The synthetic resin is preferably at least one selected from, for example, polycarbonate resins, polyethylene terephthalate resins, polyethylene naphthalate resins, polyethylene resins, polypropylene resins, polyimide resins, polystyrene resins and acrylic resins. Among them, the synthetic resin is preferably at least one selected from polycarbonate resins and acrylic resins, and more preferably a polycarbonate resin. It is to be noted that the acrylic resin is preferably at least any one selected from polyacrylonitrile and poly(meth)acrylate.

Examples of polycarbonate resins, which constitute the resin layer, include, for example, aromatic polycarbonate-based resins and aliphatic polycarbonate-based resins. These specific polycarbonate-based resins are known, and a polycarbonate-based resin described in JP-A-2010-023275 is included, for example.

One resin that constitutes the resin layer may be used alone, or a copolymer obtained by copolymerization or graft polymerization of a plurality of resin components may be used. Alternatively, a plurality of resin components may be mixed by a physical process and used as a blend material.

An adhesive layer may be provided between the resin composite and the resin layer, or the resin composite and the resin layer may directly adhere to each other without providing an adhesive layer. When an adhesive layer is provided between the resin composite and the resin layer, examples of adhesives, which constitute the adhesive layer may include, for example, acrylic resins. Examples of adhesives other than acrylic resins include, for example, vinyl chloride resins, (meth)acrylic acid ester resins, styrene/acrylic acid ester copolymer resins, vinyl acetate resins, vinyl acetate/(meth)acrylic acid ester copolymer resins, urethane resins, silicone resins, epoxy resins, ethylene/vinyl acetate copolymer resins, polyester-based resins, polyvinyl alcohol resins, ethylene vinyl alcohol copolymer resins, rubber-based emulsions such as SBR and NBR, and the like.

When no adhesive layer is provided between the resin composite and the resin layer, the resin layer may have an adhesion aid, or the surface of the resin layer may be surface-treated by a hydrophilization treatment or the like.

Examples of the adhesion aid include, for example, compounds containing at least one selected from an isocyanate group, a carbodiimide group, an epoxy group, an oxazoline group, an amino group and a silanol group, and organic silicon compounds. Among them, the adhesion aid is preferably at least one selected from a compound containing an isocyanate group (isocyanate compound) and an organic silicon compound. Examples of the organic silicon compound may include, for example, silane coupling agent condensates and silane coupling agents.

Examples of the surface treatment method can include corona treatment, plasma discharge treatment, UV irradiation treatment, electron beam irradiation treatment, and flame treatment.

<Inorganic Layer>

Substances constituting the inorganic layer are not particularly limited and examples thereof include aluminum, silicon, magnesium, zinc, tin, nickel, titanium, platinum, gold, and silver; oxides, carbides, nitrides, oxycarbides, oxynitrides, and oxycarbonitrides thereof; and mixtures thereof. From the viewpoint that high moisture resistance can be stably maintained, silicon oxide, silicon nitride, silicon oxycarbide, silicon oxynitride, silicon oxycarbonitride, aluminum oxide, aluminum nitride, aluminum oxycarbide, aluminum oxynitride, indium tin oxide (ITO) or mixtures thereof are preferred.

A method for forming an inorganic layer is not particularly limited. In general, methods of forming a thin film are roughly classified into Chemical Vapor Deposition (CVD) and Physical Vapor Deposition (PVD), either of which may be employed. Specific examples of CVD methods include plasma CVD, which utilizes plasma, and Catalyst Chemical Vapor Deposition (Cat-CVD) including catalytically cracking material gas using a heated catalyzer. Specific examples of PVD methods include vacuum deposition, ion plating, and sputtering.

As a method for forming an inorganic layer, Atomic Layer Deposition (ALD) can also be employed. The ALD method is a method for forming a thin film in an atomic layer unit by alternately supplying each of source gases of elements constituting the film to be formed to the surface on which a layer is to be formed. This method, albeit disadvantageous in a slow deposition rate, can more smoothly cover even a surface having a complicated shape than the plasma CVD method and has the advantage that a thin film having fewer defects can be formed. The ALD method also has the advantage that this method can control a film thickness at a nano order and can relatively easily cover a wide surface, for example. The ALD method can be further expected to improve a reaction rate, to achieve a low-temperature process, and to decrease unreacted gas, by using plasma.

(Uses)

The resin composite of the present invention is transparent, has high water resistance, and exerts excellent tensile properties even under wet conditions. From the viewpoint of making use of the above-described properties, the resin composite is suitable for purposes such as various display devices, light transmissive substrates for various solar cells, and the like. Also, the resin composite is suitable for purposes such as substrates for electronics, members for home electronics, window materials for various vehicles or buildings, interior materials, exterior materials, and packaging materials. Furthermore, the resin composite is also suitable for purposes such as threads, filters, woven fabrics, buffering materials, sponges, polishing materials, and other purposes of using the resin composite itself as a reinforcing material.

EXAMPLES

Hereinafter, the features of the present invention will be described more specifically with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Example 1

<Preparation of Phosphoric Acid Group-Introduced Cellulose Fiber>

As a needle kraft pulp, a pulp manufactured by Oji Paper Co., Ltd. (sheet-like having a solid content of 93% and a basis weight of 208 g/m², and a Canadian standard freeness (CSF) measured according to JIS P 8121 after disintegration of 700 ml) was used. A mixed aqueous solution of ammonium dihydrogenphosphate and urea was impregnated into 100 parts by weight of the needle kraft pulp (absolute dry mass), and the resultant mixture was pressed to 49 parts by mass of ammonium dihydrogenphosphate and 130 parts by mass of urea to obtain a chemical-impregnated pulp. The obtained chemical-impregnated pulp was dried in a dryer at 105° C. and pre-dried by evaporating moisture. Then, the resulting pulp was heated for 10 minutes in an air-blow dryer set to 140° C. to introduce a phosphoric acid group into the cellulose in the pulp. In this way, phosphorylated pulp was obtained.

Ion-exchanged water was poured to the obtained phosphorylated pulp, which was then uniformly dispersed by stirring, filtered, and dehydrated to obtain a dehydrated sheet. This operation was repeated to thoroughly wash off redundant chemicals. Subsequently, the dehydrated sheet was diluted with ion-exchanged water to a cellulose fiber concentration of 2% by mass. A 1 N aqueous solution of sodium hydroxide was gradually added while stirring to obtain a pulp slurry having a pH of 11 or more and 13 or less. Then, this pulp slurry was dehydrated to obtain a dehydrated sheet. Then, ion-exchanged water was poured again to the dehydrated sheet, which was then uniformly dispersed by stirring, filtered, and dehydrated to obtain a dehydrated sheet. This operation was repeated to thoroughly wash off redundant sodium hydroxide. In this way, phosphoric acid-modified cellulose fibers were obtained. The amount of the phosphoric acid group introduced into the obtained phosphoric acid-modified cellulose fibers was 1.50 mmol/g.

Here, the amount of the phosphoric acid group introduced was measured by diluting the cellulose with ion-exchanged water to a content of 0.2% by mass, then treating with an ion-exchange resin, and titrating with alkali. In the treatment with the ion exchange resin, 1/10 by volume of a strongly acidic ion exchange resin (Amberjet 1024: conditioning agent, manufactured by Organo Corporation) was added to a slurry containing 0.2% by mass of the cellulose, and the resultant mixture was shaken for 1 hour. Then, the mixture was poured onto a mesh having 90 μm-apertures to separate the resin from the slurry. In the alkali titration, the change in the electric conductivity value indicated by the slurry was measured while adding a 0.1 N aqueous solution of sodium hydroxide to the slurry containing cellulose fibers after the ion exchange. Specifically, the alkali amount (mmol) required in the first region of the curve shown in FIG. 1 was divided by the solid content (g) in the slurry to be titrated, and the obtained value was taken as the amount (mmol/g) of the substituent group introduced.

<Machine Treatment>

Ion-exchanged water was added to the pulp obtained after the washing and dehydration to produce a pulp suspension having a solid concentration of 2.0% by mass. This pulp suspension was treated using a wet atomization apparatus ("Ultimizer", manufactured by Sugino Machine Limited) to obtain an ultrafine cellulose fiber dispersion. In the treatment using the wet atomization apparatus, the cellulose dispersion was passed through the treatment chamber five times at a pressure of 200 MPa. The average fiber width of the ultrafine cellulose fibers contained in the ultrafine cellulose fiber dispersion was 3 to 4 nm.

<Preparation of Fiber-Resin Composite Sheet>

The ultrafine cellulose fiber dispersion obtained by the machine treatment step and an aqueous solution containing 3.0% by mass of polyvinyl alcohol (manufactured by Kanto Chemical Co., Inc.; average degree of polymerization: 2000, saponification value: 78 to 82% by mol) were mixed at an absolute dry mass ratio of 50 parts by mass:50 parts by mass to obtain a resin composite suspension. The suspension was weighed so that the finished basis weight of the sheet was 45 g/m², applied onto a commercially available acrylic plate, and dried with a chamber at 35° C. and a relative humidity of 15%. Here, a plate for damming was arranged on the acrylic plate so as to have a predetermined basis weight. As a result of the above procedure, a fiber-resin composite sheet was obtained, and its thickness was 30 μm.

<Immersion Treatment of Fiber-Resin Composite Sheet>

The fiber-resin composite sheet was immersed for 30 minutes in an aqueous solution containing aluminum sulfate tetradecahydrate to octadecahydrate (manufactured by Kanto Chemical Co., Inc.) and having an aluminum sulfate pure content of 5% by mass to perform a cross-linking treatment with aluminum. This sheet was immersed in ion-exchanged water for 15 minutes to perform washing. This washing was repeated twice, and then, the sheet was stuck to an acrylic plate and dried with a chamber at 35° C. and a relative humidity of 90%. In this way, a resin composite (sheet) of Example 1 was obtained. The resin composite (sheet) contained an aluminum ion as a polyvalent ion.

Example 2

A resin composite (sheet) was obtained in the same manner as in Example 1, except that the aqueous solution used in the immersion treatment was changed to an aqueous solution containing magnesium chloride hexahydrate (manufactured by Kanto Chemical Co., Inc.) and having a magnesium chloride pure content of 10% by mass. The resin composite (sheet) contained a magnesium ion as a polyvalent ion.

Example 3

A resin composite (sheet) was obtained in the same manner as in Example 1, except that the aqueous solution used in the immersion treatment was changed to an aqueous solution containing iron(II) sulfate heptahydrate (manufactured by Kanto Chemical Co., Inc.) and having an iron(II) sulfate pure content of 2% by mass. The resin composite (sheet) contained an iron ion as a polyvalent ion.

Example 4

A resin composite (sheet) was obtained in the same manner as in Example 1, except that the ultrafine cellulose fiber dispersion obtained by the machine treatment step and 1.8% by mass of polyethylene glycol (manufactured by Wako Pure Chemical Industries, Ltd., weight-average molecular weight: 4000000) were mixed at an absolute dry mass ratio of 83 parts by mass:17 parts by mass to obtain a resin composite suspension. The resin composite (sheet) contained an aluminum ion as a polyvalent ion.

Example 5

A resin composite (sheet) was obtained in the same manner as in Example 1, except that the ultrafine cellulose fiber dispersion obtained by the machine treatment step and an aqueous solution containing 3.0% by mass of polyvinyl alcohol (manufactured by Kanto Chemical Co., Inc.; average degree of polymerization: 2000, saponification value: 78 to 82% by mol) were mixed at an absolute dry mass ratio of 30 parts by mass:70 parts by mass to obtain a resin composite suspension. The resin composite (sheet) contained an aluminum ion as a polyvalent ion.

Example 6

A resin composite (sheet) was obtained in the same manner as in Example 1, except that the ultrafine cellulose fiber dispersion obtained by the machine treatment step and an aqueous solution containing 3.0% by mass of polyvinyl alcohol (manufactured by Kanto Chemical Co., Inc.; average degree of polymerization: 2000, saponification value: 78 to 82% by mol) were mixed at an absolute dry mass ratio of 10 parts by mass:90 parts by mass to obtain a resin composite suspension. The resin composite (sheet) contained an aluminum ion as a polyvalent ion.

Comparative Example 1

A resin composite (sheet) was obtained in the same manner as in Example 1, except that the immersion treatment with an aqueous solution of aluminum sulfate was not performed.

Comparative Example 2

A resin composite (sheet) was obtained in the same manner as in Example 5, except that the immersion treatment with an aqueous solution of aluminum sulfate was not performed.

Comparative Example 3

A resin composite (sheet) was obtained in the same manner as in Example 6, except that the immersion treatment with an aqueous solution of aluminum sulfate was not performed.

[Evaluation]
<Method>

The resin composites (sheets) prepared in Examples and Comparative Examples were evaluated according to the following evaluation methods.

(1) Water Absorption Rate of Sheet

A resin composite (sheet) of 50 mm squares was immersed in ion-exchanged water for 24 hours, and redundant water remaining on the surface was wiped off, followed by wet mass measurement. Also, another sheet was humidity-conditioned for 24 hours under conditions of 23° C. and a relative humidity of 50%, followed by humidity-conditioned mass measurement. The water absorption rate (%) of the sheet was calculated according to the following expression:

Water absorption rate (%)=(Wet mass−Humidity-conditioned mass)/Humidity-conditioned mass×100

(2) Rate of Expansion and Contraction of Sheet

A resin composite (sheet) of 50 mm squares was immersed in ion-exchanged water for 24 hours, and redundant water remaining on the surface was wiped off, followed by wet sheet area measurement. Also, another sheet was humidity-conditioned for 24 hours under conditions of 23° C. and a relative humidity of 50%, followed by humidity-conditioned sheet area measurement. The rate (%) of expansion and contraction of the sheet was calculated according to the following expression:

Rate (%) of expansion and contraction=Wet sheet area/Humidity-conditioned sheet area×100

(3) Tensile Property of Sheet (Humidity Conditioning Conditions and Wet Conditions)

The tensile strength and the tensile elastic modulus were measured in accordance with JIS P 8113 and JIS P 8135 using a tensile tester Tensilon (manufactured by A & D Co., Ltd.). For the measurement under humidity conditioning conditions, a test specimen was prepared by humidity conditioning for 24 hours at 23° C. and a relative humidity of 50%. For the measurement under wet conditions, a test specimen was prepared by immersing a sheet in ion-exchanged water for 24 hours and wiping off redundant water remaining on the surface.

In the table, "Unmeasurable (swelling/break)" refers to the state where a sheet immersed in ion-exchanged water under the above-described conditions was swollen significantly and was thereby broken at the state of preparation for the measurement of tensile properties, so that the measurement was virtually impossible.

(4) Residual Rate of Tensile Strength and Residual Rate of Tensile Elastic Modulus of Sheet (Humidity Conditioning Conditions and Wet Conditions)

The residual rate of the tensile strength of a sheet was calculated from the tensile strength under wet conditions with respect to the tensile strength under humidity conditioning conditions. The residual rate of the tensile elastic modulus of a sheet was calculated from the tensile elastic modulus under wet conditions with respect to tensile elastic modulus under humidity conditioning conditions.

TABLE 1

| Example | Addition of polyvalent ion | Resin | | Resin/fiber mass ratio | Water absorption rate [%] |
| --- | --- | --- | --- | --- | --- |
| | | Type | Molecular weight, etc. | | |
| Example 1 | Present Al$^{3-}$ | PVA | Average degree of polymerization: 2,000 Saponification value: 78-82 mol % | 50/50 | 131 |
| Example 2 | Present Mg$^{2+}$ | PVA | Average degree of polymerization: 2,000 Saponification value: 78-82 mol % | 50/50 | 259 |
| Example 3 | Present Fe$^{2+}$ | PVA | Average degree of polymerization: 2,000 Saponification value: 78-82 mol % | 50/50 | 106 |

TABLE 1-continued

| | | | | | | |
|---|---|---|---|---|---|---|
| Example 4 | Present | $Al^{3+}$ | PEG | Weight-average molecular weight: 4,000,000 | 17/83 | 74 |
| Example 5 | Present | $Al^{3+}$ | PVA | Average degree of polymerization: 2,000 Saponification value: 78-82 mol % | 70/30 | 167 |
| Example 6 | Present | $Al^{3+}$ | PVA | Average degree of polymerization: 2,000 Saponification value: 78-82 mol % | 90/10 | 359 |
| Comparative Example 1 | Absent | — | PVA | Average degree of polymerization: 2,000 Saponification value: 78-82 mol % | 50/50 | 1657 |
| Comparative Example 2 | Absent | — | PVA | Average degree of polymerization: 2,000 Saponification value: 78-82 mol % | 70/30 | 2218 |
| Comparative Example 3 | Absent | — | PVA | Average degree of polymerization: 2,000 Saponification value: 78-82 mol % | 90/10 | 1984 |

| Example | Rate of expansion and contraction [%] | Humidity conditioning conditions | | Wet conditions | | Residual rate of tensile strength [%] | Residual rate of tensile elastic modulus [%] |
|---|---|---|---|---|---|---|---|
| | | Tensile strength [MPa] | Tensile elastic modulus [GPa] | Tensile strength [MPa] | Tensile elastic modulus [GPa] | | |
| Example 1 | 100 | 89.7 | 8.6 | 32.9 | 1.2 | 36.7 | 14.0 |
| Example 2 | 100 | 103.8 | 11.3 | 9.5 | 0.78 | 9.2 | 6.9 |
| Example 3 | 100 | 73.2 | 6.7 | 28.0 | 2.4 | 38.3 | 35.8 |
| Example 4 | 100 | 53.4 | 5.4 | 23.5 | 2.7 | 44.0 | 50.0 |
| Example 5 | 100 | 119.4 | 8.8 | 50.4 | 2.2 | 42.2 | 25.0 |
| Example 6 | 100 | 86.6 | 7.1 | 8.3 | 0.23 | 9.6 | 3.2 |
| Comparative Example 1 | 149 | 120.3 | 9.6 | Unmeasurable (swelling/break) | | — | — |
| Comparative Example 2 | 144 | 106.7 | 7.6 | Unmeasurable (swelling/break) | | — | — |
| Comparative Example 3 | 186 | 84.7 | 6.7 | Unmeasurable (swelling/break) | | — | — |

As is clear from Table 1, the water absorption rate and the rate of expansion and contraction were suppressed in Examples, and the resin composites (sheets) obtained in Examples were excellent in water resistance. As is also clear, the resin composites (sheets) obtained in Examples expressed excellent tensile properties even under wet conditions. On the other hand, Comparative Examples produced results showing poor water resistance or tensile properties under wet conditions.

Here, it was confirmed that fibers were uniformly dispersed in the resin composites (sheets) obtained in Examples. Specifically, in the resin composites (sheets) obtained in Examples, in the case of measuring the concentrations of the fibers having an ionic functional group contained in the following regions (a) to (c), the fiber concentration ratio between two regions was less than 2:
(a) a region from one surface of the resin composite to 10% of the overall thickness of the resin composite;
(b) a region from the other surface of the resin composite to 10% of the overall thickness of the resin composite; and
(c) a region from the center plane in the thickness direction of the resin composite to ±5% (a total of 10%) of the overall thickness.

The invention claimed is:

1. A resin composite comprising a resin and fibers having an ionic functional group, wherein the ionic functional groups is a phosphoric acid group, and a polyvalent ion-containing solution is applied to the composite, the polyvalent is a metal ion having a valence of 3, when the mass of the resin composite immersed in ion-exchanged water for 24 hours is defined as E and the mass of the resin composite left to stand for 24 hours under conditions of 23° C. and a relative humidity of 50% is defined as F, the water absorption rate represented by (E−F)/F×100 is 500% or less, the tensile strength of the resin composite immersed in ion-exchanged water for 24 hours is 5 MPa or more, and the fibers are uniformly dispersed in the resin composite.

2. The resin composite according to claim 1, wherein the fibers are cellulose fibers having a fiber width of 1000 nm or less.

3. The resin composite according to claim 1, wherein the resin is a hydrophilic resin.

4. The resin composite according to claim 1, wherein when the area of the resin composite immersed in ion-exchanged water for 24 hours is defined as G and the area of the resin composite left to stand for 24 hours under conditions of 23° C. and a relative humidity of 50% is defined as H, the rate of expansion and contraction represented by G/H×100 is 130% or less.

5. The resin composite according to claim 1, wherein the resin composite is a sheet.

6. The resin composite according to claim 1, wherein in the case of measuring the concentrations of the fibers having an ionic functional group contained in the following regions (a) to (c), the fiber concentration ratio between two regions is less than 2:
(a) a region from one surface of the resin composite to 10% of the overall thickness of the resin composite,
(b) a region from the other surface of the resin composite to 10% of the overall thickness of the resin composite, and
(c) a region from the center plane in the thickness direction of the resin composite to ±5% (a total of 10%) of the overall thickness.

7. The resin composite according to claim 1, wherein when the tensile strength of the resin composite immersed in ion-exchanged water for 24 hours is defined as A and the tensile strength of the resin composite left to stand for 24 hours under conditions of 23° C. and a relative humidity of 50% is defined as B, the residual rate of the tensile strength represented by AB×100 is 9% or more.

8. The resin composite according to claim 1, wherein the tensile elastic modulus of the resin composite immersed in ion-exchanged water for 24 hours is 0.2 GPa or more.

9. The resin composite according to claim 1, wherein when the tensile elastic modulus of the resin composite immersed in ion-exchanged water for 24 hours is defined as C and the tensile elastic modulus of the resin composite left to stand for 24 hours under conditions of 23° C. and a relative humidity of 50% is defined as D, the residual rate of the tensile elastic modulus represented by C/D×100 is 3% or more.

10. The resin composite according to claim 1, wherein the resin composite is substantially free from lignophenol and lignophenol derivatives.

11. A method for producing a resin composite, comprising:
    forming a composite by mixing a resin with fibers having an ionic functional group; and
    applying a polyvalent ion-containing solution after forming the composite.

12. The method for producing a resin composite according to claim 11, wherein the polyvalent ion-containing solution is an aqueous solution of an inorganic metal salt.

* * * * *